US006976001B1

(12) United States Patent
Levanoni et al.

(10) Patent No.: US 6,976,001 B1
(45) Date of Patent: Dec. 13, 2005

(54) METHOD AND APPARATUS SUITABLE FOR DEMAND FORECASTING

(75) Inventors: Menachem Levanoni, Yorktown Heights, NY (US); Ying Tat Leung, Tarrytown, NY (US); Sanjay Elathur Ramaswamy, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 09/607,096

(22) Filed: Jun. 29, 2000

(51) Int. Cl.⁷ .............................................. G06F 17/60
(52) U.S. Cl. .............................. 705/10; 705/7; 705/22; 705/28
(58) Field of Search ............................... 705/10, 7, 22, 705/28

(56) References Cited

U.S. PATENT DOCUMENTS

| | | | | |
|---|---|---|---|---|
| 5,299,115 A | * | 3/1994 | Fields et al. | 705/10 |
| 5,526,257 A | * | 6/1996 | Lerner | 705/10 |
| 5,596,493 A | * | 1/1997 | Tone et al. | 705/10 |
| 5,712,985 A | * | 1/1998 | Lee et al. | 705/7 |
| 5,832,456 A | * | 11/1998 | Fox et al. | 705/10 |
| 6,078,893 A | * | 6/2000 | Ouimet et al. | 705/10 |
| 6,397,166 B1 | * | 5/2002 | Leung et al. | 702/179 |
| 6,516,301 B1 | * | 2/2003 | Aykin | 705/10 |
| 6,834,266 B2 | * | 12/2004 | Kumar et al. | 705/10 |

FOREIGN PATENT DOCUMENTS

| | | | | |
|---|---|---|---|---|
| JP | 2003223546 A | * | 8/2003 | G06F 17/60 |

OTHER PUBLICATIONS

"Company Makes Science Out of Shopping Trends" Boston Business Journal. Sep. 3, 1998. Downloaded from www.archive.org/www.grossprofit.com/pages.*
"Gymboree Selects TSI to Design and Implement Inventory optimization and Pricing Solution—Agreement Marks Significant Expansion of Successful Partnership". Press Release. Cambridge Ma. Jan. 13, 1999. Downloaded from www.archive.org/www.grossprofit.com.*
"Gymboree Uses Models to Maintain the Right Inventory Levels and Determine the Timing and Percentages of Markdowns." Stores Magazine. Nov. 1998. Downloaded from www.archive.org/www.grossprofit.com/pages.*
"Looking Back to Fashion's Future: Firm helps Retailers Develop Merchandising Plans." The Boston Globe. Oct. 7, 1998. Downloaded from www.archive.org/www.grossprofit.com/pages.*
"Best Buy Refined Inventory Process." Executive Technology. Aug. 1999. Downloaded from www.archive.org/www.grossprofit.com/pages.*
TSI Solutions from www.grossprofit.com/pages/solutions.html from www.archive.org dates Mar. 3, 2000.*

(Continued)

*Primary Examiner*—Tariq R. Hafiz
*Assistant Examiner*—Johnna Stimpak
(74) *Attorney, Agent, or Firm*—Stephen C. Kaufman, Esq.; McGinn & Gibb, PLLC

(57) ABSTRACT

Method and apparatus suitable for demand forecasting. The invention can enable sales forecasting "by item, by size, by location". The invention features combining a demand profile and a demand model into a single encompassing model which is capable of projecting demand for an identified set of merchandise.

8 Claims, 1 Drawing Sheet

OTHER PUBLICATIONS

TSI News Press Release, "Technology Strategy Inc. launched New Web Site", from www.grossprofit.com/pages/pr_web.html from www.archive.org dated Oct. 13, 1998.*

Emert, Carol. "Gap Sizzles, San Francisco apparel retailer out-markets the high-tech firms". Monday, Apr. 26, 1999, San Francisco Chronicle, from www.sfgate.com archives.*

Gilman, Hank. "Technology in the Workplace: Strategy—The Technology Edge: In Their Drive for Competitive Advantage, Retail Chains Make Strategic Use of Computers". Wall Street Journal, New York, Sep. 16, 1985. from Proquest.*

Bunn, Derek W., A.I. Vassilopoulos. Using group seasonal indices in multi-term short-term forecasting. London Business School, Sussex Place, London. International Journal of Forecasting. 1993. from dialog.*

* cited by examiner

METHOD AND APPARATUS SUITABLE FOR DEMAND FORECASTING

FIELD OF THE INVENTION

This invention relates to method and apparatus suitable for demand forecasting, for example, by way of item, attribute, and location.

BACKGROUND OF THE INVENTION

Our work on demand forecasting considers the following illustrative construct.

Contemplate a situation wherein seasonal or fashion items are sold for a finite season. The "item" considered here can be a fine line, a style, or even a style color. The items typically are not replenished during the season, and are sold in kind across seasons.

One important demand forecasting objective, informed by this situation, is to generate a sales forecast "by item, by size, by location." This sales forecast, in turn, can then be used advantageously to drive decisions on buying, allocation, markdowns and promotions.

SUMMARY OF THE INVENTION

One important goal of the present invention is to provide novel methodology and apparatus which can realize the just-cited demand forecasting objective. To this end, we first summarize two types of difficulties or problems that are adumbrated and resolved as an included, subsumed feature of the novel method and apparatus.

The first type of difficulty centers on a problem of "contaminated data". Here, observed data may be the result of a mixture of factors—inherent demand, seasonality, promotions, markdown, in-stock or not. We note that future forecasts need to be a function of the major controllable factors.

The second type of difficulty centers on a problem of sparse data. Data may be sparse for two reasons. First, many if not most items in a store are not high volume sellers, resulting in few positive sales when measured in typical planning time buckets such as weeks. Second, the number of combinations of factors affecting sales (e.g., item, size, location, seasonality, markdown, promotion) is large. Together with the relatively short history (one or two seasons) that is appropriate for seasonal/fashion items, the number of data points per confirmation of factors, is small.

We have now discovered novel methodology and apparatus which can realize the demand forecasting objective of generating a sales forecast "by item, by size, by location". As an included advantageous feature, the novel method and apparatus addresses and resolves problems relating to contaminated and/or sparse data.

The present invention in a first aspect comprises a novel method suitable for projecting demand, the method including the steps of (i) identifying a first set of merchandise;
(ii) specifying a second set of merchandise which is to be used as a referent for soliciting information relative to demand behavior for a pre-determined attribute of said first set of merchandise;
(iii) clustering the second set of merchandise for generating a demand profile for said pre-determined attribute of said first set of merchandise;
(iv) clustering the second set of merchandise for generating a demand model correlated to model-based demand attributes of said first set of merchandise; and
(v) combining the step (iii) demand profile and the step (iv) demand model into a single encompassing model which is capable of projecting demand of the first set of merchandise.

With reference to this statement of the invention as genus, we now set forth preferred particular features of the invention.

The first and second sets of merchandise may be disparate, but typically and preferably comprise overlapping sets of merchandise.

The step of selecting the pre-determined attribute of said first set of merchandise is advantageously realized by selecting from a group consisting of items, size, and location; or, selection, from a group consisting of items, size, color, and location.

Step (iv) preferably comprises generating a demand model based on modeling demand as a function of major variables selected from a group consisting of price, promotions, inventory level, and seasonal objects.

Step (v) preferably comprises combining the demand profile and the demand model into a single encompassing model by apportioning the model-based demand forecasts, to the appropriate size distribution, using a size demand profile.

The present invention in a second aspect comprises a computer operated method for projecting demand, including the steps of:

(i) identifying in a database a first set of merchandise and a second set of merchandise which is to be used as a referent for soliciting information relative to demand behavior for a pre-determined attribute of said first set of merchandise;
(ii) employing a processor for:
   (a) clustering the second set of merchandise for generating a demand profile for said pre-determined attribute of said first set of merchandise;
   (b) clustering the second set of merchandise for generating a demand model correlated to model-based demand attributes of said first set of merchandise; and
   (c) combining the demand profile and the demand model into a single encompassing model which is capable of projecting demand of the first set of merchandise; and
(iii) displaying the demand forecasts by the pre-determined attribute.

The present invention in a third aspect comprises a computer suitable for projecting demand, the computer including:

(i) a database comprising an identified first set of merchandise;
(ii) a database comprising an identified second set of merchandise which is to be used as a referent for soliciting information relative to demand behavior for a pre-determined attribute of said first set of merchandise;
iii) a CPU receiving inputs from the database and comprising means for:
   (a) clustering the second set of merchandise for generating a demand profile for said pre-determined attribute of said first set of merchandise;
   (b) clustering the second set of merchandise for generating a demand model correlated to model-based demand attributes of said first set of merchandise;

(c) combining the demand profile and the model into a single encompassing model which is capable of projecting demand of the first set of merchandise; and (iv) an output display for showing the demand forecasts by the pre-determined attribute.

BRIEF DESCRIPTION OF THE DRAWING

The invention is illustrated in the accompanying drawing, in which.

DETAILED DESCRIPTION OF THE INVENTION

Figure 1:
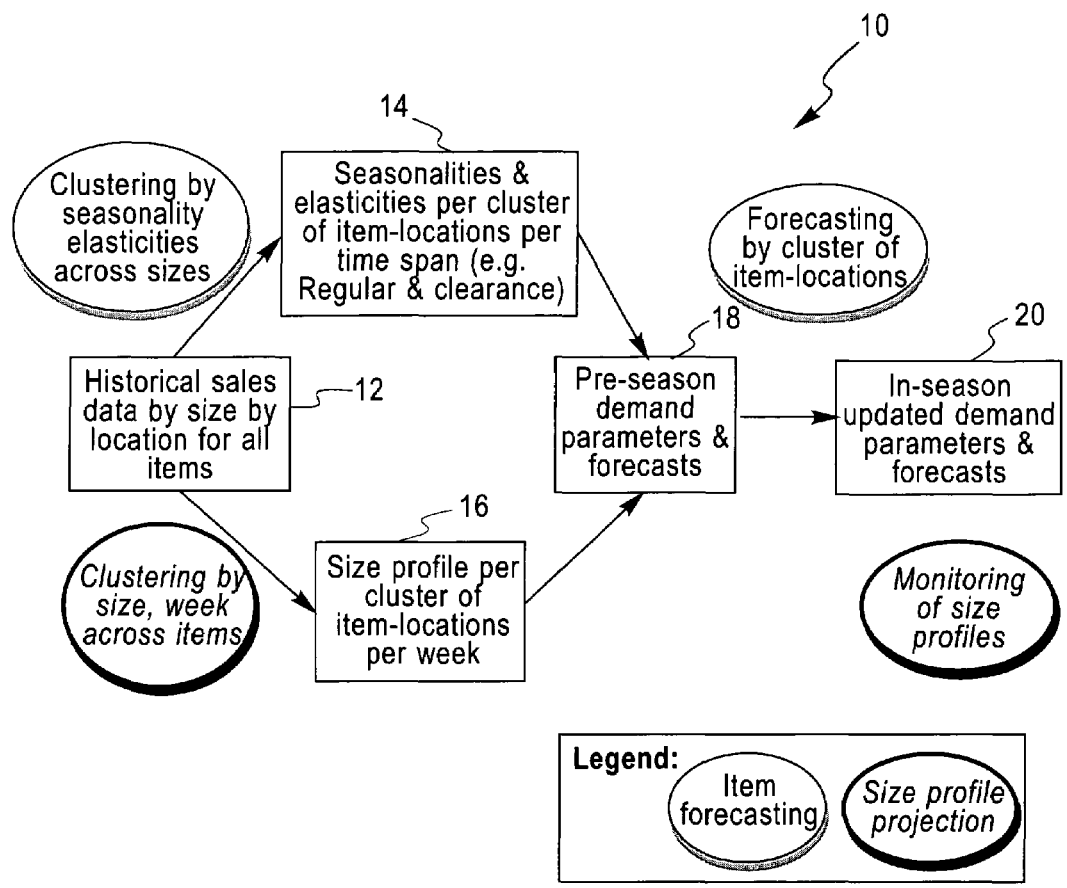
FIG. 1 shows an Outline of a Forecasting Process developed in accordance with principles of the present invention.

The detailed description of the invention unfolds by first setting forth, in a list format, desiderata pertinent to "Item Forecasting" and then "Size Profile Projection", and then secondly presenting an Example of the invention. Reference should be made to FIG. 1, (numerals 10–20), which provides an overview of the invention.

1) Item Forecasting.

The Item Forecasting component provides methods to project sales for a selected set of merchandise during pre-season planning or in-season re-planning/monitoring.

The main features of the forecasting model are:
 a. It can handle relatively short history, such as those of new fashion items.
 b. It can take into account selling price and promotional activities throughout the season.
 c. Provided enough history, it can estimate a trend if present in the data.
 d. It can handle the above mentioned causal and time series factors in an integrated manner.

Approach:
 i. Basic analysis per season or year. Cluster sales data by seasonality and price/promotion elasticity's using model-based clustering.
 ii. During the season, update parameters (base sales, seasonalities, and price/promotion elasticities) using dynamic modeling and the initial parameter values from the basic analysis. If the product is a new class to the retailer and there is no "similar" historical data, the user can specify initial parameter values based on their expert knowledge.
 iii. Sales forecasts by cluster can be computed using the most updated parameters. Forecasts per sku (including size) can be computed by apportioning the above forecast.

2) Size Profile Projection.

The main function here is to project a size profile for apparel items per store so that merchandise can be purchased accordingly. Size Profile Projection may be achieved as follows:

A periodic analysis of recent historical sales data to obtain a basic size profile per store. Data from replenishable as well as seasonal items are useful. This can be performed once a year or once every season.

Approach:
 i. Estimation of lost sales to complete sales data by size.
 ii. Cluster sales data by mean sales per size per time period using e.g., k-mean method.

We now illustrate the details of this invention by way of an Example.

Assume we are given a task to forecast, by size and location, a demand for women's swimsuits manufactured by a certain manufacturer. This is the first set of merchandise (e.g. as in claim 1 step i).

We are given last season's sales figures for this particular item, by location and size. At this detail level, weekly sales are sparse on the average. Furthermore, these sales are also affected by seasonality effects, promotions, markdowns, and inventory levels. In order to overcome the sparsity problem, we select, as a second set of merchandise, the first set of merchandise, and in or addition, swimsuits from other manufacturers, as well as other fashion items such as women's dresses, shoes, and sweaters. This corresponds to e.g., claim 1 step ii.

We now run a clustering algorithm such as the K-Means algorithm, the Kohonen network algorithm, the Learning Vector Quantization algorithm, or equivalent, which partitions the second set of merchandise into clusters with "similar" size profiles (for each location and each period, e.g., week). Similarity here, simply means that all members of a cluster have an identical size distribution, or very close to it. This corresponds to e.g., claim 1 step iii and addresses the data sparsity problem.

To address the effects of other variables on demand profiles, we perform a model-based clustering procedure on the same second set of merchandise. This model includes seasonal indices, markdowns, promotions and inventory levels. It partitions the second set of merchandise into clusters with "similar" profiles for these variables. Here, similarity means that all members of a cluster have identical (or almost identical) seasonal indices, markdown and promotion sensitivities, as well as inventory effects. This corresponds to claim 1 step iv.

At this point we can forecast demand by location and size by first performing the model-based forecasts which considers seasonality, pricing, promotion, and inventory levels, and the apportioning of these forecasts by location and size, using the clustered size profiles. This corresponds to e.g., claim 1 step v.

In a preferred embodiment, the clustering and modeling are performed once, at the beginning of a sale season, at which time an initial demand distribution, by location and size, is computed. As new data become available, demand projections get updated dynamically.

What is claimed:

1. A method suitable for projecting demand, the method comprising:
 (i) identifying a first set of merchandise;
 (ii) specifying a second set of merchandise which is to be used as a referent for soliciting information relative to demand behavior for a pre-determined attribute of said first set of merchandise;
 (iii) clustering the second set of merchandise for generating a demand profile for said pre-determined attribute of said first set of merchandise by utilizing a clustering algorithm which partitions said second set into non-overlapping clusters with similar size profiles;
 (iv) clustering the second set of merchandise for generating a demand model correlated to model-based demand attributes of said first set of merchandise, said clustering the second set of merchandise for generating a demand model comprising generating a demand model based on modeling demand as a function of major variables being selected from a group consisting of price, promotions, inventory level, and seasonal effects; and (v) combining the demand profile and the demand model into a single encompassing model which is capable of projecting demand of the first set of merchandise, wherein at least one of said clustering for generating a demand profile, said clustering for generating a demand model, and said combining the generated demand profile and generated demand model are executed on a computer central processing unit (CPU).

2. A method according to claim 1, wherein said first and second sets of merchandise are disparate.

3. A method according to claim 1, wherein said first and second sets of merchandise overlap.

4. A method according to claim 1, further comprising:
selecting the pre-determined attribute of said first set of merchandise from the group consisting of item, size, and location.

5. A method according to claim 1, further comprising:
selecting a pre-determined attribute of said first set of merchandise from the group consisting of item, size, color, and location.

6. A method according to claim 1, wherein said combining the demand profile and the model comprises combining the demand profile and the demand model into a single encompassing model by apportioning the model-based demand forecasts, to the appropriate size distribution, using a size demand profile.

7. A computer implementable method comprising:
(i) identifying a first set of merchandise;
(ii) specifying a second set of merchandise which is to be used as a referent for soliciting information relative to demand behavior for a pre-determined attribute of said first set of merchandise;
(iii) clustering the second set of merchandise for generating a demand profile for said pre-determined attribute of said first set of merchandise;
(iv) clustering the second set of merchandise for generating a demand model correlated to model-based demand attributes of said first set of merchandise, said clustering the second set of merchandise for generating a demand model comprising generating a demand model based on modeling demand as a function of major variables being selected from a group consisting of price, promotions, inventory level, and seasonal effects; and (v) combining the generated demand profile and the generated demand model into a single encompassing model which is capable of projecting demand of the first set of merchandise, wherein at least one of said clustering for generating a demand profile, said clustering for generating a demand model, and said combining the generated demand profile and generated demand model are executed on a computer central processing unit (CPU).

8. A computer system suitable for projecting demand, the computer system comprising:
(i) a database comprising an identified first set of merchandise;
(ii) a database comprising an identified second set of merchandise which is to be used as a referent for soliciting information relative to demand behavior for a pre-determined attribute of said first set of merchandise;
(iii) a CPU receiving inputs from the database and comprising means for:
  (a) clustering the second set of merchandise for generating a demand profile for said pre-determined attribute of said first set of merchandise;
  (b) clustering the second set of merchandise for generating a demand model correlated to model-based demand attributes of said first set of merchandise; and
  (c) combining the demand profile and the demand model into a single encompassing model which is capable of projecting demand of the first set of merchandise, said clustering the second set of merchandise for generating a demand model comprising generating a demand model based on modeling demand as a function of major variables being selected from a group consisting of price, promotions, inventory level, and seasonal effects; and
(iv) an output display for showing the demand forecasts by the pre-determined attribute.

* * * * *